C. GORE.
SPEED INDICATOR FOR AUTOMOBILES.
APPLICATION FILED APR. 24, 1911.
1,091,059. Patented Mar. 24, 1914.
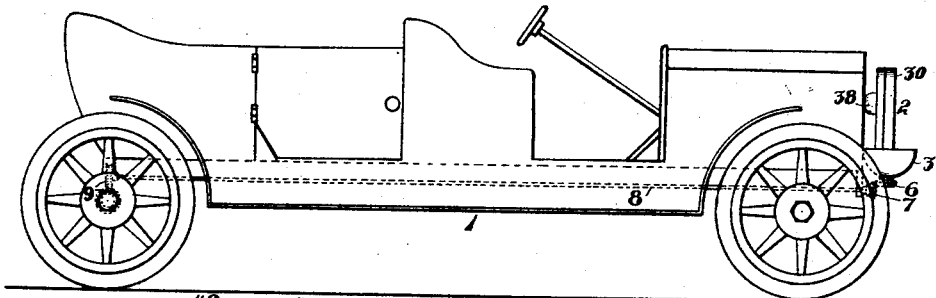
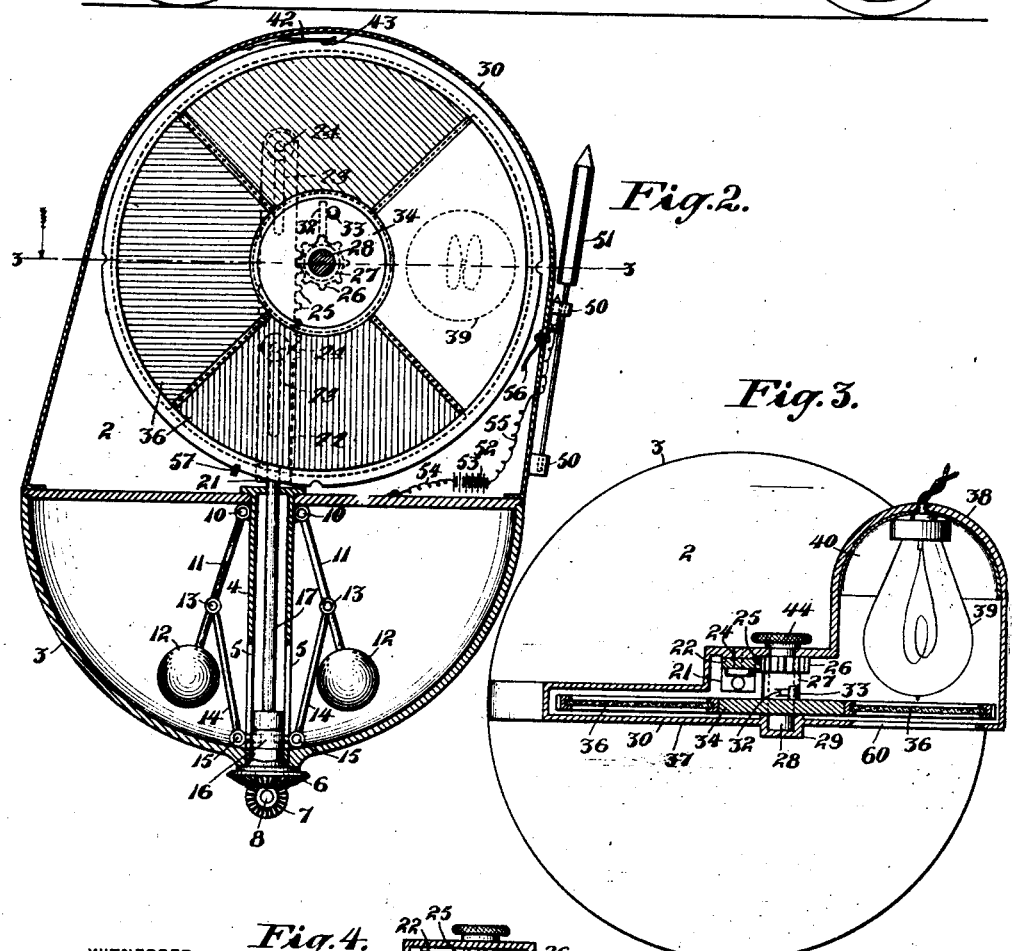
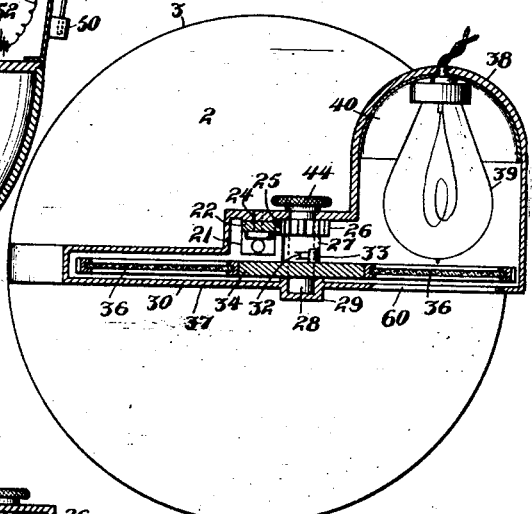
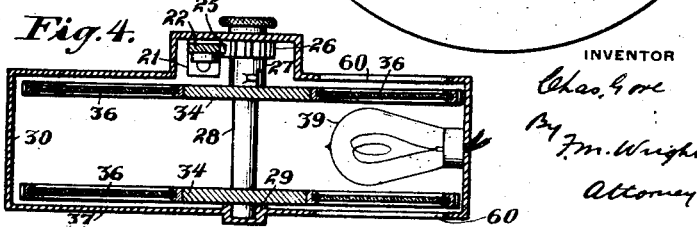
WITNESSES
F. C. Thedner
N. B. Keating
INVENTOR
Chas. Gore
By F. M. Wright
Attorney.

UNITED STATES PATENT OFFICE.

CHARLES GORE, OF SAN FRANCISCO, CALIFORNIA.

SPEED-INDICATOR FOR AUTOMOBILES.

1,091,059. Specification of Letters Patent. Patented Mar. 24, 1914.

Application filed April 24, 1911. Serial No. 622,926.

*To all whom it may concern:*

Be it known that I, CHARLES GORE, a subject of the King of Great Britain, residing at San Francisco, in the county of San Francisco and State of California, have invented new and useful Improvements in Speed-Indicators for Automobiles, of which the following is a specification.

The object of the present invention is to provide an apparatus to be placed on automobiles for furnishing a signal visible at a considerable distance of the fact that the speed of the automobile has exceeded a predetermined limit.

Cities almost universally have enacted ordinances requiring that automobiles passing therethrough should not exceed a certain limit of speed; but it is very difficult to enforce such ordinances, principally on account of the difficulty of proving that the prescribed limit has been exceeded. Occasionally also automobile drivers complained of arrests for exceeding the speed limit, when in fact such limit has not been exceeded.

The object of the present invention is to provide a signal, easily visible both by day time and at night, which is set when the speed limit has been exceeded, and remains set until the automobile is stopped and the device restored to normal condition.

In the accompanying drawing, Figure 1 is a side view of an automobile equipped with my improved apparatus; Fig. 2 is an enlarged vertical sectional view of the apparatus; Fig. 3 is an enlarged horizontal section thereof on the line 3—3 of Fig. 2; Fig. 4 is a sectional view of a modified form of a portion of said apparatus.

Referring to the drawing, 1 indicates an automobile. At either end thereof may be supported the device 2, which forms the subject of my invention. In the present instance it is shown at the front end, and comprises a lower casing 3, which is approximately hemispherical in form, at the vertical axis of which is rotatably mounted a tube 4, slotted, as shown at 5, in the lower portion, its lower end being secured, outside the casing 3, to a bevel wheel 6 meshing with a bevel wheel 7 on a shaft 8 extending beneath the body of the car, and operatively connected as shown at 9, with the rear axle of said automobile. By the movement of the machine, said tube 4 is given a rotary motion dependent upon the speed of the machine. Upon said tube are pivoted, as shown at 10, arms 11, having at their free ends weights 12 which arms are pivotally connected, as shown at 13, to links 14, which are pivoted to lugs 15, passing through said slots 5 in the tube 4, and extending from a collar 16 secured within the tube 4 and engaging a collar secured to the end of a rod 17 passing centrally upward through said tube. By the movement of the vehicle said weights are given a rotary movement and by said rotary movement are caused to rise and raise the rod 17. The upper end of said rod is secured to an extension 21 at the lower end of a vertical slide rod 22 which has slots 23 moving on fixed pins 24. Said slide rod is formed on one side with a rack 25 which engages a pinion 26 on a sleeve 27 around a shaft 28 having bearings 29 in the sides of an upper casing 30. Said sleeve 27 carries an arm 32 adapted to engage a pin 33 upon a wheel 34 secured to said shaft 28. Said wheel 34 comprises sectors 36 formed respectively of colorless glass and glass of different colors, as green, blue and red. Only a portion of one of these sectors is visible from a distance, the remaining sectors and the remainder of the first named sector being hidden by a wall 37. Behind the visible sector the upper casing 30 has an extension 38 in which is a lamp 39 and reflector 40 adapted to reflect the light of the lamp through said visible sector.

When the machine is at rest said slide rod is in its lowest position and the colorless sector is in the visible position. When the machine is set in motion, the slide rod tends to rise. Its upward movement is, however, restrained by a spring latch 42, which, in the position of rest, enters the first of a series of recesses 43 formed in the periphery of the wheel, and offers resistance to the upward pressure of the rod 17. When, on account of the increased velocity of the machine, the pressure of the rod 17 overcomes the resistance of said latch and presses said latch out of said recess, then the wheel moves quickly around under the pressure to bring another sector into visible position, showing at night time a colored light and in the day time glass of a similar color. If the velocity of the machine still further increases, the pressure of the rod 17 again increases, until it is sufficient to overcome the resistance of the latch to cause the wheel to rotate through a sufficient arc to bring the next sector into visible position.

It will be seen that, by the engagement of the two members, the arm 32 and the pin 33, being wholly propulsive, and never retractive, the signal thus actuated will not be withdrawn by the mere decrease of the speed of the vehicle, as the latch will hold the wheel in the farthest advanced position to which it has been rotated, and such decrease in speed will have the effect only of withdrawing the arm 32 from the pin 33. The signal can only be reset to zero position by hand, by turning the shaft 34 by means of a knob 44 on the end of said shaft.

I also provide means for actuating a signal which is visible at a great distance, which may or may not be used in conjunction with the aforesaid signal. For this purpose there are provided guides 50 for a rocket 51, which is ignited by an electric spark in a circuit 52, containing a battery 53, and comprising a wire 54 connected to the casing of the apparatus, and a wire 55 connected to a contact 56 adjacent to the periphery of the wheel and insulated from the casing. A second contact 57 is carried on the wheel and when the two contacts are brought together, as by an excessive speed of the machine, the circuit is closed across the spark gap so that on the circuit being broken across said gap, a spark is generated causing the rocket to be ignited. This latter device is intended particularly for winding and mountainous roads.

In the modification shown in Fig. 4, the casing is formed on both sides with an aperture 60 opposite to the lamp, so that the light can be seen either in front or behind.

I claim:—

In combination with a centrifugal governor, a device movable longitudinally with a change of speed in said governor, a disk having variously colored sectors, a lamp behind the disk arranged to shine through one of said sectors, spring-actuated means arranged to engage in turn each sector as the disk is rotated, members movable with the device and disk, the member movable with the device having an engagement wholly propulsive with the member movable with the disk.

In testimony whereof I have hereunto set my hand in the presence of two subscribing witnesses.

CHARLES GORE.

Witnesses:
 FRANCIS M. WRIGHT,
 N. B. KEATING.